(12) United States Patent
Bastide et al.

(10) Patent No.: US 10,565,275 B2
(45) Date of Patent: *Feb. 18, 2020

(54) MODIFYING MESSAGES TO BE MORE DISCOVERABLE ON A SOCIAL NETWORK

(71) Applicant: International Business Machines Corporation, Armonk, NY (US)

(72) Inventors: Paul R. Bastide, Boxford, MA (US); Matthew E. Broomhall, Goffstown, NH (US); Thomas J. Evans, IV, Cary, NC (US); Robert E. Loredo, North Miami Beach, FL (US)

(73) Assignee: International Business Machines Corporation, Armonk, NY (US)

( * ) Notice: Subject to any disclaimer, the term of this patent is extended or adjusted under 35 U.S.C. 154(b) by 164 days.

This patent is subject to a terminal disclaimer.

(21) Appl. No.: 15/805,461

(22) Filed: Nov. 7, 2017

(65) Prior Publication Data

US 2018/0107747 A1    Apr. 19, 2018

Related U.S. Application Data

(63) Continuation of application No. 15/293,003, filed on Oct. 13, 2016, now Pat. No. 10,242,113.

(51) Int. Cl.
*G06F 16/00* (2019.01)
*G06F 16/9535* (2019.01)
(Continued)

(52) U.S. Cl.
CPC ......... *G06F 16/9535* (2019.01); *G06Q 50/01* (2013.01); *G06F 16/24578* (2019.01)

(58) Field of Classification Search
None
See application file for complete search history.

(56) References Cited

U.S. PATENT DOCUMENTS 8,375,024 B2    2/2013   Goeldi
9,003,294 B1 *  4/2015   Ames ............... G06Q 10/10
                                                          715/739
(Continued)

FOREIGN PATENT DOCUMENTS

EP    2892186 A1    7/2015
EP    3009942 A1    4/2016

OTHER PUBLICATIONS

SaneBox, "SaneBox for Business," https://www.sanebox.com/business, 2016, pp. 1-3.

(Continued)

*Primary Examiner* — Son T Hoang
(74) *Attorney, Agent, or Firm* — Robert A. Voigt, Jr.; Winstead, P.C.

(57) ABSTRACT

A method, system and computer program product for improving the discoverability of messages on a social network. The creation of a proposed message that requests a response from a target audience is detected. The social network is then searched to identify search terms and posts related to the proposed message. Upon identifying the search terms, the search terms are ranked in order of usage among the identified posts. A list of identified search terms in order of rank is then presented to the user to modify the proposed message. The proposed message is modified using a search term selected by the user from the list of search terms. The modified message is then posted on the social network. In this manner, the message created by the user has been modified to improve the discoverability of the message on the social network and to increase responses from an appropriate target audience.

7 Claims, 5 Drawing Sheets

(51) Int. Cl.
*G06Q 50/00* (2012.01)
*G06F 16/2457* (2019.01)

(56) References Cited

U.S. PATENT DOCUMENTS

| | | | |
|---|---|---|---|
| 9,881,010 B1* | 1/2018 | Gubin | G06F 17/30011 |
| 2013/0262592 A1* | 10/2013 | DeLuca | G06Q 10/107 |
| | | | 709/206 |
| 2014/0359008 A1 | 12/2014 | Finney et al. | |
| 2015/0100586 A1 | 4/2015 | Caruso | |
| 2015/0248476 A1 | 9/2015 | Weissinger et al. | |
| 2016/0140619 A1 | 5/2016 | Soni et al. | |
| 2016/0269344 A1* | 9/2016 | Anders | H04L 51/32 |
| 2016/0328401 A1* | 11/2016 | Dhawan | G06F 17/30867 |
| 2017/0187668 A1* | 6/2017 | Elliott | H04L 51/32 |

OTHER PUBLICATIONS

Anonymously, "System and Method to Share Information in Social Network Based on Mining Chat Message and Browsing History," IP.com, IP.com No. IPCOM000212660D, Nov. 22, 2011, pp. 1-7.
Jaho et al., "Joint Interest- and Locality-Aware Content Dissemination in Social Networks," Wireless On-Demand Network Systems and Services, Sixth International Conference, 2009, pp. 173-180.
List of IBM Patents or Patent Applications Treated as Related, Nov. 7, 2017, pp. 1-2.
Office Action for U.S. Appl. No. 15/293,003 dated Jul. 26, 2018, pp. 1-24.
List of IBM Patents or Patent Applications Treated as Related, Jan. 11, 2019, pp. 1-2.

\* cited by examiner

MODIFYING MESSAGES TO BE MORE DISCOVERABLE ON A SOCIAL NETWORK

TECHNICAL FIELD

The present invention relates generally to social media communications, and more particularly to modifying messages to be more discoverable on a social network.

BACKGROUND

There are many different ways to share and process information among users, such as via social media posts. For example, a user may post a message on the user's social network profile space, such as a wall, or on an activity stream (e.g., news feed, timeline). Such a mechanism allows users to rapidly share information with others as well as rapidly gather information from others.

However, such messages may not necessarily be distributed to the appropriate or intended group. For example, messages may only be posted for the sole purpose in hopes of eliciting a response without considering the aspect of the message being discovered by the appropriate or the intended group. Consequently, the author of the message may not receive many responses, if at all, from his/her message due to the lack of discoverability of the message.

SUMMARY

In one embodiment of the present invention, a method for improving the discoverability of messages on a social network comprises detecting a creation of a proposed message that requests a response from a target audience. The method further comprises searching the social network to identify search terms and posts related to the proposed message. The method additionally comprises ranking the identified search terms in order of usage among the identified posts. Furthermore, the method comprises presenting a list of identified search terms in order of rank to a user to modify the proposed message. Additionally, the method comprises modifying, by a processor, the proposed message using a search term from the list of identified search terms in response to the user selecting the search term from the list of identified search terms. In addition, the method comprises posting the modified message on the social network.

Other forms of the embodiment of the method described above are in a system and in a computer program product.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE DRAWINGS

A better understanding of the present invention can be obtained when the following detailed description is considered in conjunction with the following drawings, in which.

DETAILED DESCRIPTION

The present invention comprises a method, system and computer program product for improving the discoverability of messages on a social network. In one embodiment of the present invention, the creation of a proposed message that requests a response from a target audience is detected. The social network is then searched to identify search terms and posts related to the proposed message. For example, natural language processing may be utilized to search the social network to identify search terms (e.g., "McCarron traded") and posts related to the proposed message (e.g., "Starting QB Team traded. What are your thoughts?"). Upon identifying the search terms, the search terms are ranked in order of usage among the identified posts. A list of identified search terms in order of rank is then presented to the user to modify the proposed message. The proposed message is modified using a search term from the list of identified search terms that was selected by the user. The modified message is then posted on the social network. In this manner, the message created by the user has been modified to improve the discoverability of the message on the social network and to increase responses from an appropriate target audience by including terms that are more likely to catch the attention of intended recipients, especially if such search terms are currently trending.

In the following description, numerous specific details are set forth to provide a thorough understanding of the present invention. However, it will be apparent to those skilled in the art that the present invention may be practiced without such specific details. In other instances, well-known circuits have been shown in block diagram form in order not to obscure the present invention in unnecessary detail. For the most part, details considering timing considerations and the like have been omitted inasmuch as such details are not necessary to obtain a complete understanding of the present invention and are within the skills of persons of ordinary skill in the relevant art.

Figure 1:
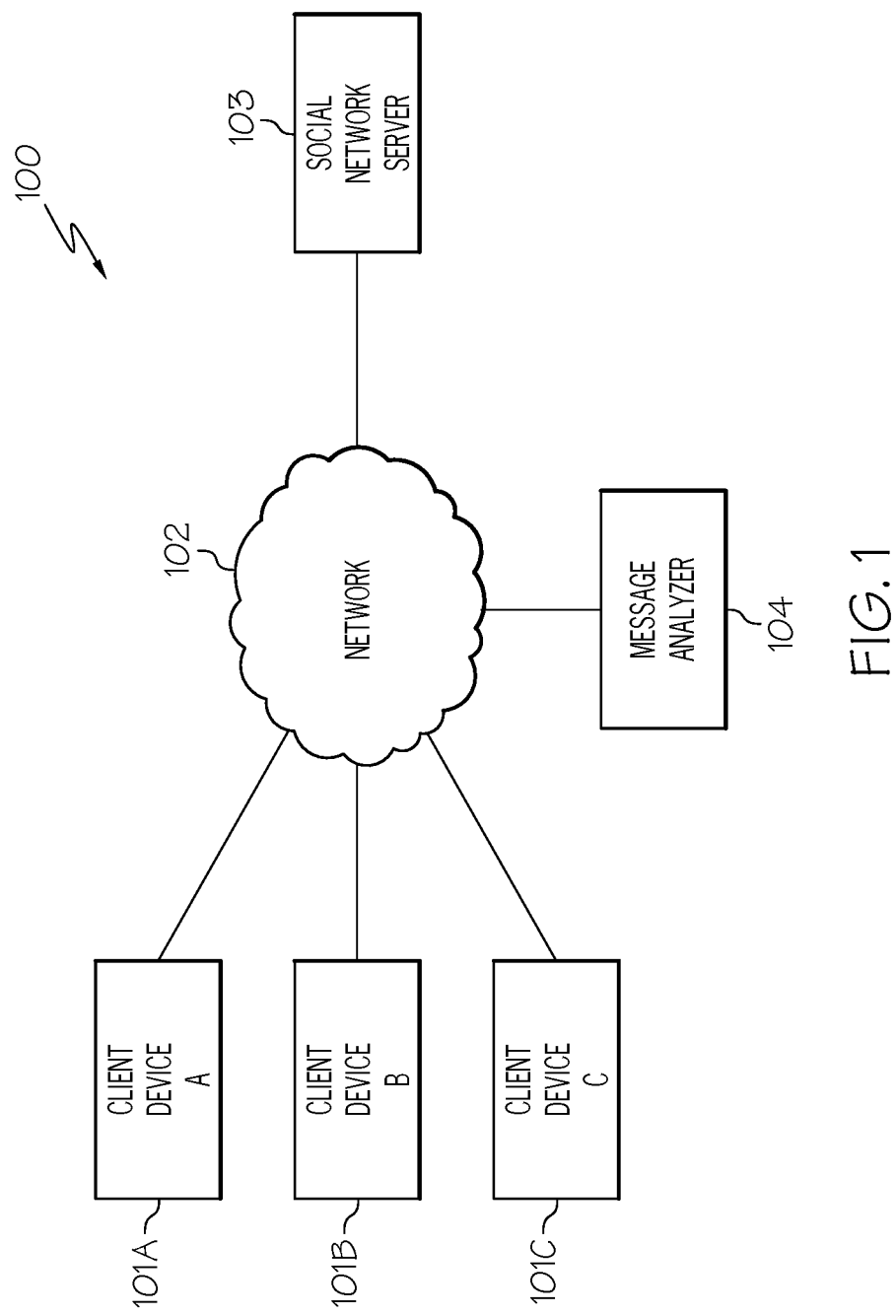
FIG. 1 illustrates a social network system configured in accordance with an embodiment of the present invention.

Referring now to the Figures in detail, FIG. 1 illustrates a social network system 100 configured in accordance with an embodiment of the present invention. Referring to FIG. 1, social network system 100 includes a community of users using client devices 101A-101C (identified as "Client Device A," "Client Device B," and "Client Device C," respectively, in FIG. 1) to be involved in social network system 100. Client devices 101A-101C may collectively or individually be referred to as client devices 101 or client device 101, respectively. It is noted that both computing devices 101 and the users of computing devices 101 may be identified with element number 101. Client device 101 may be a portable computing unit, a Personal Digital Assistant (PDA), a smartphone, a laptop computer, a mobile phone, a navigation device, a game console, a desktop computer system, a workstation, an Internet appliance and the like.

Client devices 101 may participate in a social network by communicating (by wire or wirelessly) over a network 102, which may be, for example, a local area network, a wide area network, a wireless wide area network, a circuit-switched telephone network, a Global System for Mobile Communications (GSM) network, Wireless Application Protocol (WAP) network, a WiFi network, an IEEE 802.11 standards network, various combinations thereof, etc. Other networks, whose descriptions are omitted here for brevity, may also be used in conjunction with system 100 of FIG. 1 without departing from the scope of the present invention.

System 100 further includes a social network server 103, which may be a web server configured to offer a social networking and/or microblogging service, enabling users of client devices 101 to send and read other users' posts. "Posts," as used herein, include any one or more of the following: text (e.g., messages, comments, sub-comments and replies), audio, video images, etc. Social network server 103 is connected to network 102 by wire or wirelessly. While FIG. 1 illustrates a single social network server 103, it is noted for clarity that multiple servers may be used to implement the social networking and/or microblogging service.

System 100 further includes what is referred to herein as the "message analyzer" 104 connected to network 102 by wire or wirelessly. Message analyzer 104 is configured to modify a message being created by a user of client device 101 in a manner that allows the message to be more discoverable after it is posted on the social network as discussed further below. A description of the hardware configuration of message analyzer 104 is provided below in connection with FIG. 2.

System 100 is not to be limited in scope to any one particular network architecture. System 100 may include any number of client devices 101, networks 102, social network servers 103 and message analyzers 104. Furthermore, in one embodiment, message analyzer 104 may be part of client device 101 or social network server 103.

Figure 2:
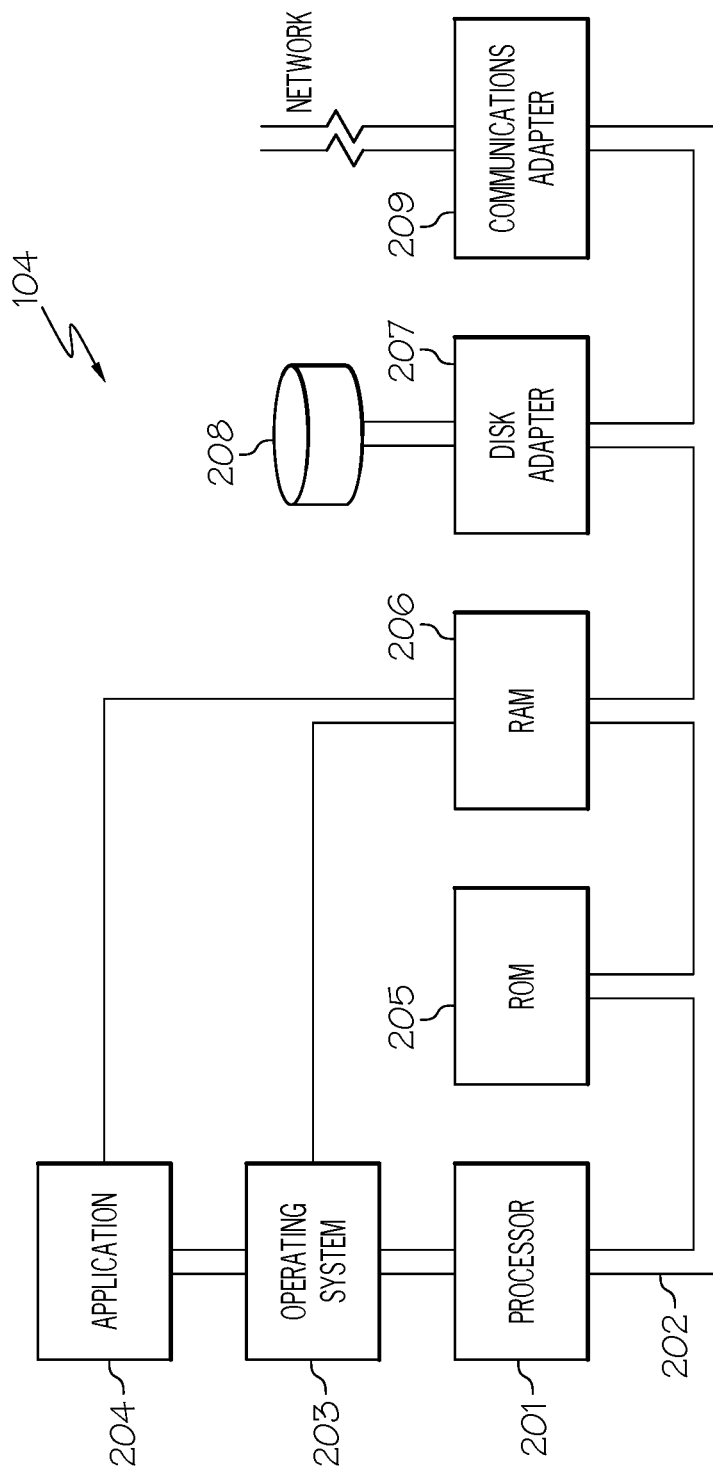
FIG. 2 illustrates a hardware configuration of a message analyzer configured in accordance with an embodiment of the present invention.

Referring now to FIG. 2, FIG. 2 illustrates a hardware configuration of message analyzer 104 (FIG. 1), which is representative of a hardware environment for practicing the present invention. Referring to FIG. 2, message analyzer 104 has a processor 201 coupled to various other components by system bus 202. An operating system 203 runs on processor 201 and provides control and coordinates the functions of the various components of FIG. 2. An application 204 in accordance with the principles of the present invention runs in conjunction with operating system 203 and provides calls to operating system 203 where the calls implement the various functions or services to be performed by application 204. Application 204 may include, for example, a program for improving the discoverability of a message on a social network as discussed further below in association with FIGS. 3A-3B and 4.

Referring again to FIG. 2, read-only memory ("ROM") 205 is coupled to system bus 202 and includes a basic input/output system ("BIOS") that controls certain basic functions of message analyzer 104. Random access memory ("RAM") 206 and disk adapter 207 are also coupled to system bus 202. It should be noted that software components including operating system 203 and application 204 may be loaded into RAM 206, which may be message analyzer's 104 main memory for execution. Disk adapter 207 may be an integrated drive electronics ("IDE") adapter that communicates with a disk unit 208, e.g., disk drive. It is noted that the program for improving the discoverability of a message on a social network as discussed further below in association with FIGS. 3A-3B and 4, may reside in disk unit 208 or in application 204.

Message analyzer 104 may further include a communications adapter 209 coupled to bus 202. Communications adapter 209 interconnects bus 202 with an outside network (e.g., network 102 of FIG. 1) thereby allowing message analyzer 104 to communicate with client devices 101 and social network server 103.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As stated in the Background section, there are many different ways to share and process information among users, such as via social media posts. For example, a user may post a message on the user's social network profile space, such as a wall, or on an activity stream (e.g., news feed, timeline). Such a mechanism allows users to rapidly share information with others as well as rapidly gather information from others. However, such messages may not necessarily be distributed to the appropriate or intended group. For example, messages may only be posted for the sole purpose in hopes of eliciting a response without considering the aspect of the message being discovered by the appropriate or the intended group. Consequently, the author of the message may not receive many responses, if at all, from his/her message due to the lack of discoverability of the message.

Figure 3A:
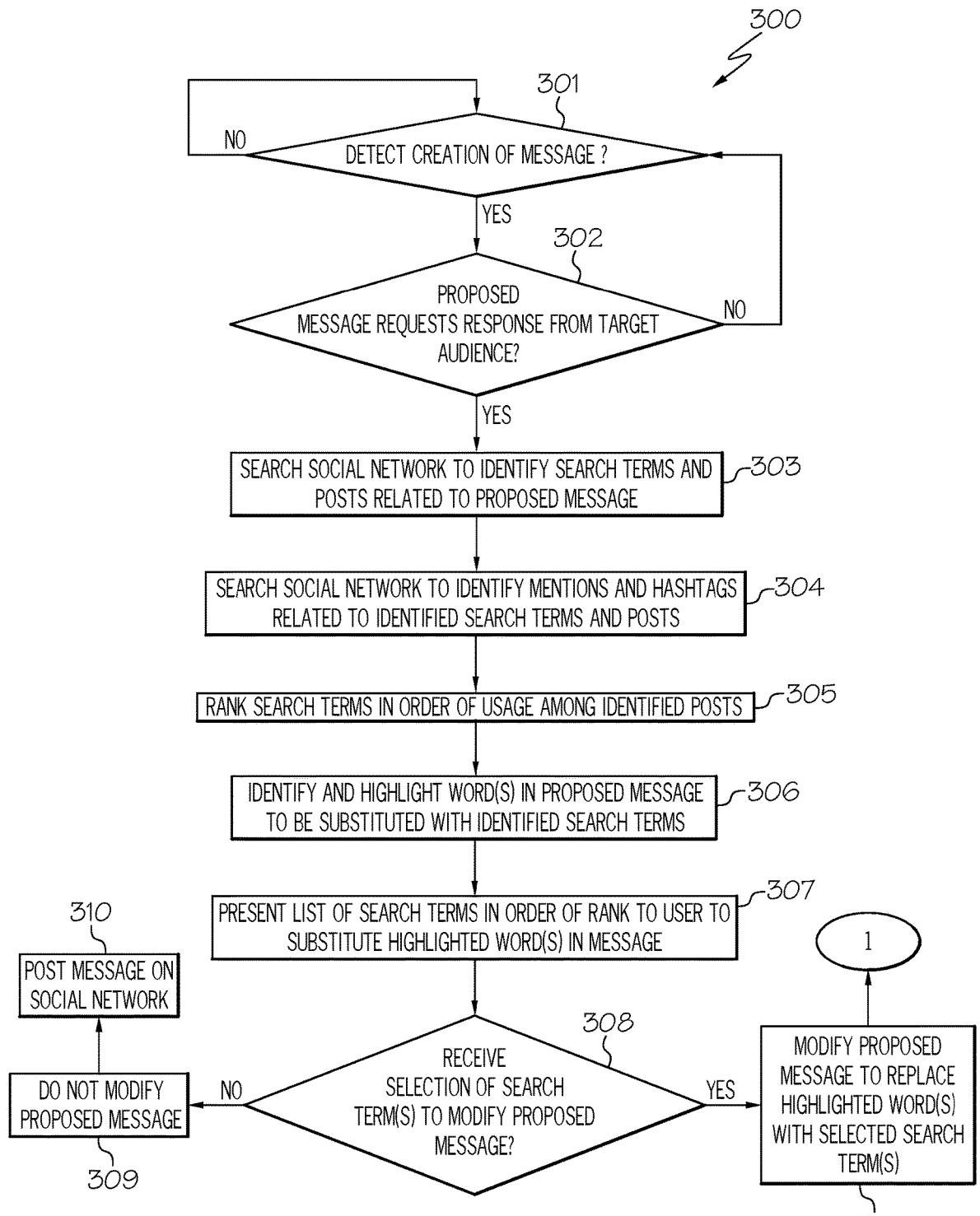
FIGS. 3A-3B are a flowchart of a method for improving the discoverability of a message on a social network where the message does not include a mention or hashtag in accordance with an embodiment of the present invention.
Figure 3B:
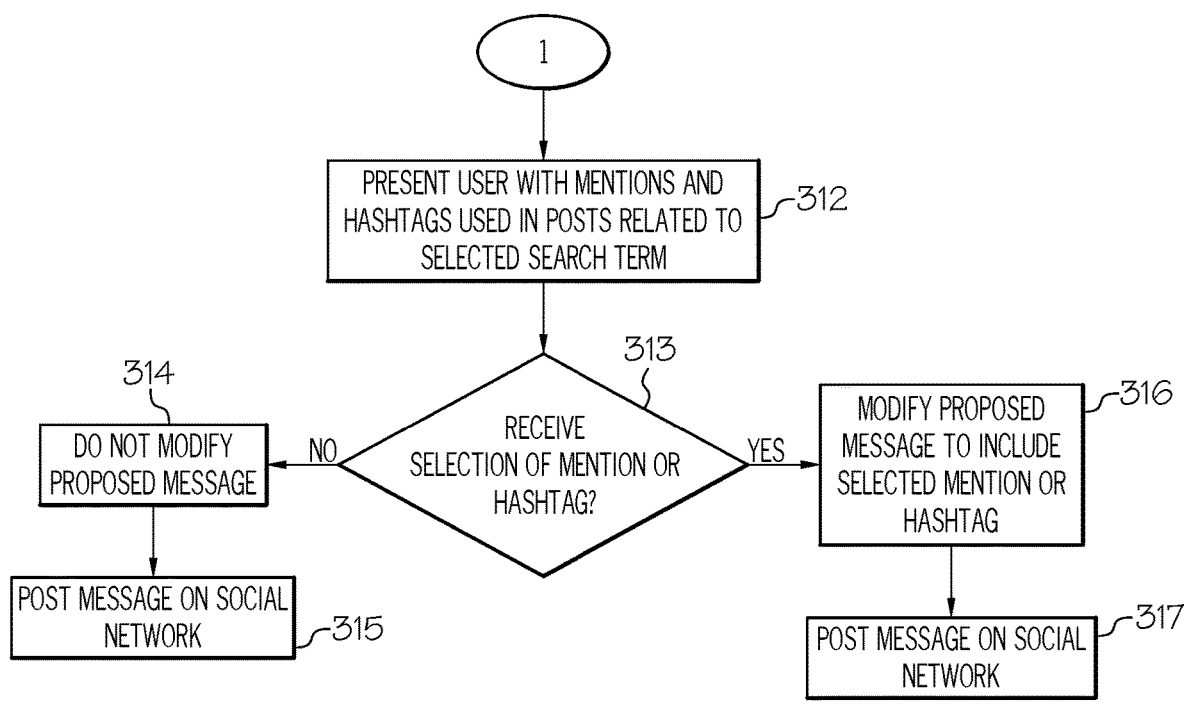
Figure 4:
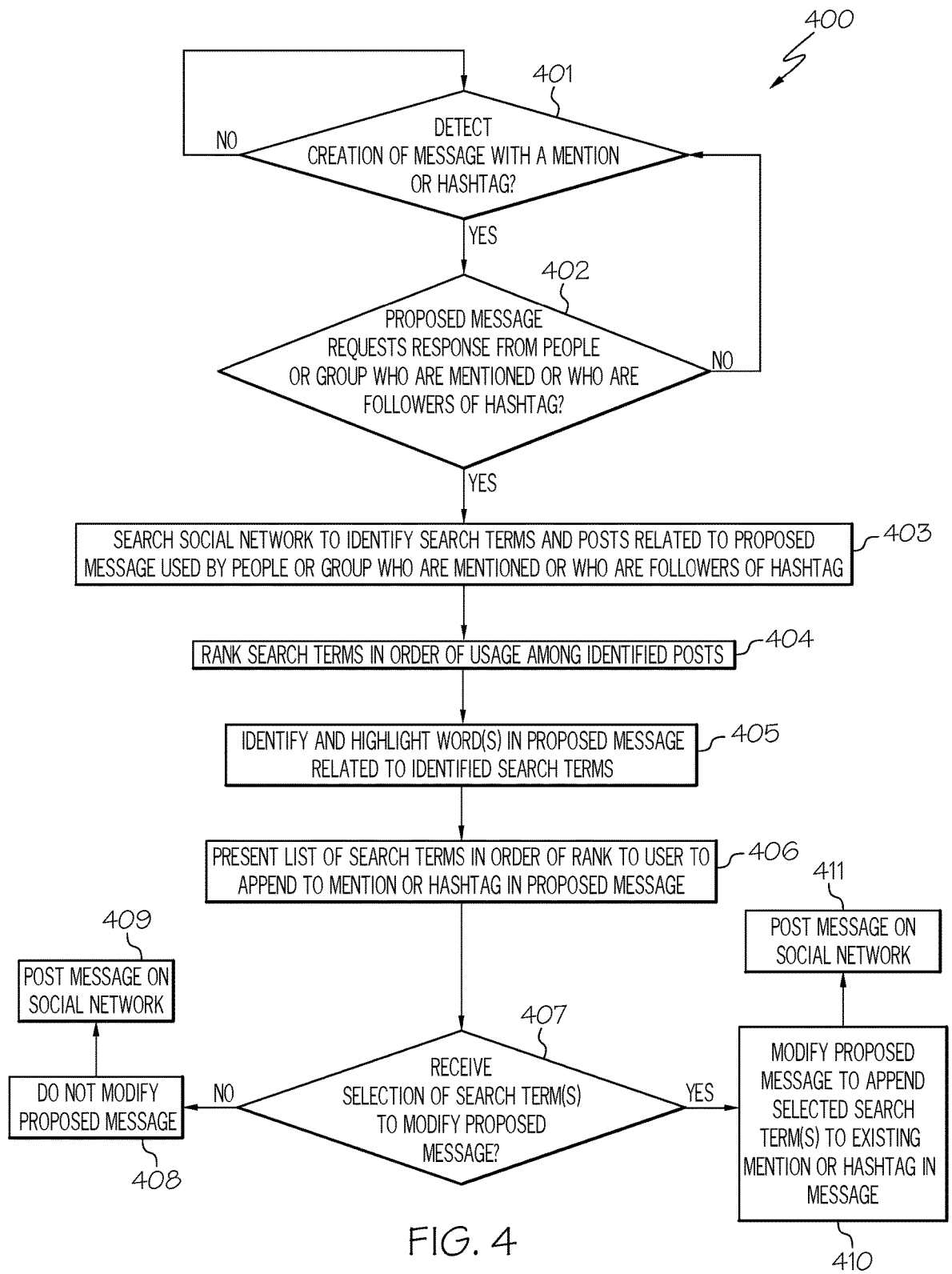
FIG. 4 is a flowchart of a method for improving the discoverability of a message on a social network where the message includes a hashtag or mention in accordance with an embodiment of the present invention.

The principles of the present invention provide a means for improving the discoverability of a message on a social network by the author's targeted group as discussed below in connection with FIGS. 3A-3B and 4. FIGS. 3A-3B are a flowchart of a method for improving the discoverability of a message on a social network where the message does not include a mention or hashtag. FIG. 4 is a flowchart of a method for improving the discoverability of a message on a social network where the message includes a mention or hashtag.

As stated above, FIGS. 3A-3B are a flowchart of a method 300 for improving the discoverability of a message on a social network where the message does not include a mention or hashtag in accordance with an embodiment of the present invention.

Referring now to FIG. 3A, in conjunction with FIGS. 1-2, in step 301, a determination is made by message analyzer 104 as whether the creation of a proposed message by user 101 is detected. In one embodiment, message analyzer 104 monitors the selection of an icon (e.g., message icon, tweet button) by user 101 indicating the intention of creating a message. In another embodiment, message analyzer 104 monitors for text entered in a message box used for posting a message on a social network. In one embodiment, user 101 may indicate the creation of a message to message analyzer 104 via a user interface of computing device 101.

If message analyzer 104 has not detected the creation of a proposed message by user 101, then message analyzer 104 continues to monitor for the creation of a proposed message by user 101 in step 301.

If, however, message analyzer 104 has detected the creation of a proposed message by user 101, then, in step 302, a determination is made by message analyzer 104 as to whether the proposed message requests a response from a target audience.

In one embodiment, message analyzer 104 utilizes natural language processing to determine whether the proposed message requests a response from a target audience. For example, if user 101 uses a question mark in his/her proposed message, then such a punctuation mark may indicate a request for a response to the user's message. In another example, message analyzer 104 may utilize natural language processing to identify keywords that signify a request for a response, such as "what" or "when." For instance, user 101 may type the message "Starting QB Team traded. What are your thoughts?" In such a message, the keyword "what" and the punctuation mark of "?" may be used by message analyzer to conclude that the proposed message requests a response from a target audience.

In one embodiment, message analyzer 104 utilizes natural language processing to determine the target audience of the proposed message. For example, in the proposed message of "Starting QB Team traded. What are your thoughts?", it may be inferred that the target audience involves fans of football since the term "QB" is an abbreviation for the quarterback position in the game of football. Furthermore, message analyzer 104 may analyze the social profile of the user 101 who composed the message to identify further information, such as favorite sports teams. If user 101 indicated that he/she follows the Cincinnati Bengals football team, then it may be inferred that user 101 is referring to the starting quarterback of the Cincinnati Bengals football team, and hence, the target audience are fans of the Cincinnati Bengals football team.

In another embodiment, message analyzer 104 may also analyzer the social profiles of the user's friends, where the user's friends may be identified on the user's social profile page (e.g., friend list). Such friends may be deemed to be a target audience.

In another embodiment, message analyzer 104 utilizes geolocation to identify a target audience, such as a target audience that would be inclined to respond immediately. For example, user 101 may be located at a baseball game while he/she is creating the proposed message. Hence, the target audience may include those watching the same baseball game as user 101, such as the friends of user 101 who have indicated they are watching the same baseball game on their social profile.

In another embodiment, message analyzer 104 utilizes an identified communication medium (e.g., broadcast of baseball game on Internet and television) to identify a target audience, such as a target audience that would be inclined to respond immediately. For example, user 101 may be located at a baseball game while he/she is creating the proposed message. The baseball game may also be currently broadcasted. As a result, the target audience may include those watching the baseball game (e.g., watching the game on their smartphone, watching the game on their television), including the user's friends who have indicated they are baseball enthusiasts on their social profile page.

In one embodiment, only messages deemed to be of a certain importance, containing confidential information, containing a specific keyword (e.g., "why") or based on paid/promoted offering, are modified to improve the discoverability of the message as discussed below.

If the proposed message does not request a response from a target audience, then message analyzer 104 continues to monitor for the creation of a proposed message by user 101 in step 301.

If, however, the proposed message requests a response from a target audience, then, in step 303, message analyzer 104 searches the social network to identify search terms and posts related to the proposed message. In one embodiment, such search terms are search terms used in messages posted by the target audience determined in step 302 that are related to the proposed message. In one embodiment, the posts are messages posted by the target audience determined in step 302.

In one embodiment, message analyzer 104 utilizes natural language processing to identify search terms and posts related to the proposed message. For instance, referring to the above example, in the proposed message of "Starting QB Team traded. What are your thoughts?", message analyzer 104 searches the social network to identify search terms and posts involving a Cincinnati Bengals quarterback being traded (or possibly being traded). As previously discussed, it was determined by message analyzer 104 that the term "QB" referred to the quarterback position in football and that the quarterback referenced was probably the quarterback that played for the Cincinnati Bengals since user 101 is a big fan of the Cincinnati Bengals football team. Furthermore, as discussed above, message analyzer 104 may have determined that the followers of the Cincinnati Bengals football team are the target audience. As a result, message analyzer 104 searches the social network to identify search terms and posts from followers of the Cincinnati Bengals football team involving a trade (rumor or actual) of the starting quarterback of the Cincinnati Bengals football team.

For example, message analyzer 104 may identify the following search terms used by the target audience: "McCarron traded," and "McCarron new team." In a further example, message analyzer 104 may identify the following post used by the target audience: "A J McCarron traded to Dallas—New QB."

In one embodiment, message analyzer 104 only identifies search terms and posts that occurred within a window of time (e.g., last 24 hours). In one embodiment, message analyzer 104 may only identifies search terms involving at least two terms. In one embodiment, message analyzer 104 may limit the analysis to specific languages, minimum frequency and social recommendations.

In one embodiment, message analyzer 104 only identifies search terms and posts that are deemed to be most important or relevant to the target audience involving the proposed message. For example, message analyzer 104 only identifies the search terms and posts that are deemed to be most important or relevant to the target audience involving the topic of the proposed message. For instance, if the proposed message involved the hockey player Henrik Zetterberg, then, using natural language processing, message analyzer 104 would identify search terms and posts deemed to be most important or relevant to the target audience involving the proposed message, such as the health status of Henrik Zetterberg. Message analyzer 104 may determine that the health status is an important topic to followers of the hockey player Henrik Zetterberg since it involves the availability of Henrik Zetterberg playing the game of hockey.

In one embodiment, message analyzer 104 may utilize synonyms, colloquialisms, antonyms, etc. of keywords identified in the proposed message when searching the social network in order to expand the set of identified search terms and posts related to the proposed message. Furthermore, message analyzer 104 may normalize subject/proper nouns into the general subject to expand the set of identified search terms and posts related to the proposed message.

In one embodiment, message analyzer 104 may have a list of terms to be excluded from being selected as search terms.

In one embodiment, message analyzer 104 may utilize sentiment analysis in identifying search terms and posts related to the proposed message on the social network. For example, message analyzer 104 may identify those search terms that are consistent with the attitude of user 101 expressed in the proposed message.

In step 304, message analyzer 104 searches the social network to identify mentions (@mention) and hashtags (#) related to the identified search terms and posts. For example, in the posts directed to McCarron being traded, the mentions and hashtags of @cincyjungle, #bengals-nation, and #cowboys were used.

In step 305, message analyzer 104 ranks the search terms in order of usage among the identified posts. For example, message analyzer 104 may rank the following observed terms in order of highest usage: McCarron traded, McCarron new team. By ranking the observed terms in order of highest usage, those terms that are used the most are likely to improve the discoverability of the proposed message if utilized in the proposed message.

In step 306, message analyzer 104 identifies and highlights the word(s) in the proposed message to be substituted with the identified search terms. In one embodiment, message analyzer 104 utilizes natural language processing to match the word(s) used in the proposed message that coincides with the meaning of the most utilized search terms, such as the highest ranked search terms. Such word(s) can be highlighted to indicate that more appropriate search terms can replace such word(s) to improve the discoverability of the message on the social network. For example, in the proposed message of "Starting QB Team traded. What are your thoughts?", the words of "Team traded" may be highlighted since they coincide with the meaning of the most utilized search terms (e.g., McCarron traded, McCarron new team).

In step 307, message analyzer 104 presents a list of search terms in order of rank to user 101 to substitute the highlighted word(s) in the proposed message. For example, the list of the search terms may include the search terms of "McCarron traded," and "McCarron new team," in order of rank (most utilized to least utilized).

In step 308, a determination is made by message analyzer 104 as to whether it received a selection of search term(s) from the presented list of search terms by user 101 to modify the proposed message.

If user 101 did not select a search term from the presented list of search terms to modify the proposed message, then, in step 309, message analyzer 104 does not modify the proposed message.

In step 310, message analyzer 104 posts the message on the social network.

If, however, message analyzer 104 received a selection of search term(s) from the presented list of search terms by user 101, then, in step 311, message analyzer 104 modifies the proposed message to replace the highlighted word(s) with the selected search term(s).

For example, in the proposed message of "Starting QB Team traded. What are your thoughts?", where the words of "Team traded" are highlighted, if user 101 selects the search term of "McCarron traded" from the list of search terms provided to user 101, then the message is modified as follows: "Starting QB McCarron traded. What are your thoughts?"

In one embodiment, message analyzer 104 includes a type-ahead feature to modify the message whereby if user 101 enters a character to modify the message, message analyzer 104 auto-completes the word using the term that highly correlates to the topic or activity of the proposed message relevant to the target audience. For example, message analyzer 104 uses natural language processing to determine the topic or activity of the proposed message. For instance, message analyzer 104 uses natural language processing to identify keywords (e.g., baseball, hockey, travel) to determine the topic of the proposed message. When the user enters the character(s) of "ho," message analyzer 104 may automatically complete the word "hockey" if the proposed message is directed to the sport of hockey and is relevant to the target audience (e.g., followers of a hockey team).

In one embodiment, message analyzer 104 splits the proposed message into multiple new messages to maximize the discoverability of the message. For example, message analyzer 104 may determine that the message would be more likely to be discovered and responded by shortening the length of the message and splitting the message into multiple messages. In one embodiment, message analyzer 104 implements a threshold number of characters in determining whether a message is to be split to maximize the discoverability of the message.

Referring now to FIG. 3B, in conjunction with FIGS. 1-2, in step 312, message analyzer 104 presents the user with a list of mentions and hashtags used in posts related to the selected search term (e.g., "McCarron traded"). For example, message analyzer 104 presents the following list of mentions and hashtags of "@cincyjungle," "#bengals-nation," and "#cowboys" that are related to the selected search term of "McCarron traded." Such mentions and hashtags may be used by user 101 to improve the discoverability of the message on the social network.

In step 313, a determination is made by message analyzer 104 as to whether it received a selection of a mention or hashtag from the presented list of mentions and hashtags by user 101.

If message analyzer 104 did not receive a selection of a mention or hashtag from user 101, then, in step 314, message analyzer 104 does not modify the proposed message.

In step 315, message analyzer 104 posts the message on the social network.

If, however, message analyzer 104 received a selection of a mention or hashtag from user 101, then, in step 316, message analyzer 104 modifies the proposed message by including the selected mention or hashtag. For instance, referring to the above example, if user 101 selected the mention/hashtag of "#bengals-nation," then the proposed message would be modified as follows: "Starting QB McCarron traded. What are your thoughts? #bengals-nation".

In this manner, the message created by user 101 has been modified to improve the discoverability of the message on the social network by including such search term(s) and/or mention(s)/hashtag(s) which are more likely to catch the attention of recipients, especially if such search term(s)/mention(s)/hashtag(s) are currently trending. Furthermore, by including such search term(s) and/or mention(s)/hashtag(s), the recipients will be more appropriate. That is, user 101 will be able to reach the appropriate target audience by including those term(s)/and/or mention(s)/hashtag(s) that are designed to catch their attention. Furthermore, user 101 will receive more responses to his/her message by an appropriate target audience.

Upon modifying the proposed message as discussed in step 316, message analyzer 104, in step 317, posts the message on the social network.

At times, user 101 may create a message that specifically states a targeted group, such as via a mention or hashtag. A process for improving the discoverability of such messages is discussed below in connection with FIG. 4.

FIG. 4 is a flowchart of a method 400 for improving the discoverability of a message on a social network where the message includes a mention or hashtag in accordance with an embodiment of the present invention.

Referring now to FIG. 4, in conjunction with FIGS. 1-2 and 3A-3B, in step 401, a determination is made by message analyzer 104 as whether the creation of a proposed message with a mention or hashtag by user 101 is detected. Message analyzer 104 determines whether the creation of a proposed message with a mention or hashtag by user 101 (e.g., "Slice-and-diced ECMA 9.0a JavaScript released to open source engineers. #engineers") is detected in the same manner as determining whether the creation of a proposed message is detected in step 301. For the sake of brevity, the details regarding the determination step will not be reiterated for the sake of brevity.

If message analyzer 104 has not detected the creation of a proposed message by user 101, then message analyzer 104 continues to monitor for the creation of a proposed message with a mention or hashtag by user 101 in step 401.

If, however, message analyzer 104 has detected the creation of a proposed message with a mention or hashtag by user 101, then, in step 402, a determination is made by message analyzer 104 as to whether the proposed message requests a response from people or a group who are mentioned or who are followers of the hashtag.

For example, in the proposed message of "Slice-and-diced ECMA 9.0a JavaScript released to open source engineers. #engineers", message analyzer 104 determines whether the proposed message requests a response from the followers of #engineers.

In one embodiment, message analyzer 104 utilizes natural language processing to determine whether the proposed message requests a response from the people or the group who are mentioned or who are followers of the hashtag as discussed above in connection with step 302. For the sake of brevity, the details regarding the determination step will not be reiterated for the sake of brevity.

If the proposed message does not request a response from the people or the group who are mentioned or who are followers of the hashtag, then message analyzer 104 continues to monitor for the creation of a proposed message with a mention or hashtag by user 101 in step 401.

If, however, the proposed message requests a response from the people or the group who are mentioned or who are followers of the hashtag, then, in step 403, message analyzer 104 searches the social network to identify search terms and posts related to the proposed message used by the people or the group who are mentioned or who are followers of the hashtag.

In one embodiment, message analyzer 104 utilizes natural language processing to identify search terms and posts related to the proposed message used by the people or the group who are mentioned or who are followers of the hashtag as discussed above in connection with step 303. For example, message analyzer 104 identifies the search terms of: "ECMA advancement," "ruby glass," "ruby," as well as the post of "ECMA is terribly tough." For the sake of brevity, the details regarding the searching step will not be reiterated for the sake of brevity.

In step 404, message analyzer 104 ranks the search terms in order of usage among the identified posts. For example, message analyzer 104 may rank the following observed terms in order of highest usage: ruby, ecma, glass. By ranking the observed terms in order of highest usage, those terms that are used the most are likely to improve the discoverability of the proposed message if utilized in the proposed message. In one embodiment, message analyzer 104 ranks the search terms in order of usage among the identified posts as discussed above in connection with step 305. For the sake of brevity, the details regarding the ranking step will not be reiterated for the sake of brevity.

In step 405, message analyzer 104 identifies and highlights the word(s) in the proposed message related to the identified search terms. In one embodiment, message analyzer 104 utilizes natural language processing to match word(s) used in the proposed message that coincides with the meaning of the most utilized search terms, such as the highest ranked search terms.

In step 406, message analyzer 104 presents a list of search terms in order of rank to user 101 to append to the mention or hashtag in the proposed message. For example, the list of the search terms may include the search terms of "ruby," "ecma," and "glass."

In step 407, a determination is made by message analyzer 104 as to whether it received a selection of search term(s) from the presented list of search terms by user 101 to modify the proposed message.

If user 101 did not select a search term from the presented list of search terms to modify the proposed message, then, in step 408, message analyzer 104 does not modify the proposed message.

In step 409, message analyzer 104 posts the message on the social network.

If, however, message analyzer 104 received a selection of search term(s) from the presented list of search terms by user 101, then, in step 410, message analyzer 104 modifies the proposed message to append the selected search term(s) to the existing mention or hashtag in the proposed message.

For instance, in the proposed message of "Slice-and-diced ECMA 9.0a JavaScript released to open source engineers. #engineers", if user 101 selects the search terms of "ruby" and "ecma," then the message is modified as follows: "Slice-and-diced ECMA 9.0a JavaScript released to open source engineers. #engineers ruby ecma".

In one embodiment, as discussed above, message analyzer 104 includes a type-ahead feature to modify the message whereby if user 101 enters a character to modify the message, message analyzer 104 auto-completes the word using the term that highly correlates to the topic or activity of the proposed message relevant to the target audience. For example, message analyzer 104 uses natural language processing to determine the topic or activity of the proposed message. For instance, message analyzer 104 uses natural language processing to identify keywords (e.g., baseball, hockey, travel) to determine the topic of the proposed message. When the user enters the character(s) of "ho," message analyzer 104 may automatically complete the word "hockey" if the proposed message is directed to the sport of hockey and is relevant to the target audience (e.g., followers of a hockey team).

In one embodiment, message analyzer 104 splits the proposed message into multiple new messages to maximize the discoverability of the message. For example, message analyzer 104 may determine that the message would be more likely to be discovered and responded by shortening the length of the message and splitting the message into multiple messages. In one embodiment, message analyzer 104 implements a threshold number of characters in determining whether a message is to be split to maximize the discoverability of the message.

In step 411, message analyzer 104 posts the message on the social network.

In this manner, the message created by user 101 has been modified to improve the discoverability of the message on the social network by appending such search term(s) to the mention or hashtag which are more likely to catch the attention of recipients, especially if such search term(s) are currently trending. Furthermore, by appending such search term(s) to the mention or hashtag, the recipients will be more appropriate. That is, user 101 will be able to reach the appropriate target audience by appending those term(s) to the mention or hashtag that are designed to catch their attention. Furthermore, user 101 will receive more responses to his/her message by an appropriate target audience.

As a result of the principles of the present invention, messages are modified to be more discoverable on a social network. Modifying messages in the manner discussed herein is performed in a non-conventional way. By using computing technology to modify messages, such as replacing term(s) in a proposed message with relevant search term(s) identified on a social network or inserting a relevant mention or hashtag identified on the social network or appending relevant search term(s) identified on the social network to a pre-existing mention or hashtag in the proposed message, the message will now be more likely to be discovered and responded by an appropriate target audience thereby increasing the number of responses the author of the message will receive. Increasing the number of responses the author of the message will receive improves the utilization of online social networks.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method for improving discoverability of messages on a social network, the method comprising:
    detecting a creation of a proposed message that requests a response from a target audience, wherein the creation of the proposed message is detected by detecting keywords being entered in a message box used for posting the message on the social network, wherein the proposed message is analyzed using natural language processing to determine that the proposed message requests the response from the target audience;
    searching the social network to identify search terms and posts related to the proposed message, wherein the search terms were used in messages posted by the target audience and the posts were posted by the target audience, wherein natural language processing and sentiment analysis are used to identify the search terms and posts related to at least a sentiment of a user creating the proposed message, wherein the identified search terms and posts are deemed to be most important or relevant to the target audience involving the proposed message;
    searching the social network to identify mentions and hashtags related to the identified search terms and posts;
    ranking the identified search terms in order of usage among the identified posts;
    identifying and highlighting one or more words in the proposed message to be substituted with one or more of the ranked search terms;
    presenting a list of ranked search terms to the user to substitute the one or more highlighted words in the proposed message;
    modifying the proposed message by replacing a highlighted word with a respective search term from the list of ranked search terms in response to the user selecting the respective search term;
    presenting the user with a list of mentions and hashtags from the identified mentions and hashtags related to the selected respective search term;
    receiving a selection of a mention or a hashtag from the list of mentions and hashtags;
    modifying the proposed message by including the selected mention or hashtag; and
    posting the modified proposed message on the social network.

2. The method as recited in claim 1 further comprising:
    utilizing synonyms, colloquialisms and antonyms of the keywords detected in the proposed message when searching the social network to expand at least a subset of the identified search terms and posts related to the proposed message.

3. The method as recited in claim 1 further comprising:
    utilizing a list of terms to be excluded from being selected as search terms from the list of ranked search terms.

4. The method as recited in claim 3,
    wherein the proposed message is modified using a type-ahead feature.

5. The method as recited in claim 1, wherein the proposed message comprises a mention or a hashtag, wherein the method further comprises:
    searching the social network to identify search terms and posts related to the proposed message used by a member or a group of members who are mentioned by the mention or are followers of the hashtag.

6. The method as recited in claim 5 further comprising:
    presenting the list of ranked identified search terms to the user to append to the mention or the hashtag included in the proposed message;
    receiving a selection of the search term from the list of ranked identified search terms; and
    modifying the proposed message by appending the selected search term to the mention or the hashtag included in the proposed message.

7. The method as recited in claim 1, wherein the modification of the proposed message comprises splitting the proposed message into multiple new messages.

* * * * *